(12) United States Patent
Shultz

(10) Patent No.: US 6,321,151 B1
(45) Date of Patent: Nov. 20, 2001

(54) AUTOMOTIVE DIAGNOSTIC INTERFACE DEVICE

(76) Inventor: Paul Shultz, 78 Tyner Road Wantirna South, Victoria 3152 (AU)

( * ) Notice: Subject to any disclaimer, the term of this patent is extended or adjusted under 35 U.S.C. 154(b) by 0 days.

(21) Appl. No.: 09/569,452

(22) Filed: May 12, 2000

(51) Int. Cl.[7] ............................ G01M 15/00; G06F 15/74
(52) U.S. Cl. ...................... 701/29; 340/635; 340/825.69; 340/438; 345/2; 345/173; 701/115; 701/32
(58) Field of Search ................................ 701/29, 33, 35; 364/424.04, 550, 424.03; 340/439

(56) References Cited

U.S. PATENT DOCUMENTS

| 4,989,146 | * | 1/1991 | Imajo .............................. 364/424.04 |
| 5,003,476 | * | 3/1991 | Abe .................................. 364/424.03 |
| 5,041,976 | * | 8/1991 | Marko et al. ................... 364/424.03 |
| 5,050,080 | * | 9/1991 | Abe .................................. 364/424.04 |
| 5,081,599 | * | 1/1992 | Saito ............................... 364/551.01 |
| 5,313,388 | * | 5/1994 | Cortis ............................. 364/424.04 |
| 5,884,202 | * | 3/1999 | Arjomand ............................. 701/29 |
| 5,912,941 | * | 6/1999 | Schmitt ................................. 378/91 |
| 5,916,286 | * | 6/1999 | Seashore et al. ...................... 701/29 |
| 5,953,700 | * | 9/1999 | Kanevsky et al. . | |

* cited by examiner

*Primary Examiner*—William A. Cuchlinski, Jr.
*Assistant Examiner*—Tuan C To

(57) ABSTRACT

An automotive diagnostic interface device for quickly determining engine problems from a remote location. The automotive diagnostic interface device includes includes a hand-held interface unit including a housing, a microprocessor disposed in the housing and having circuitry for interfacing with an engine management computer system and also having circuitry for transforming and transmitting data to a receiver/transmitter with the hand-held interface unit further including an input cable connected to the microprocessor and having an end, and an output cable connected to the microprocessor and having an end; and also includes an adapter plug securely connected to the end of the input cable and being adapted to be received in a diagnostic port of the engine management computer system; and further includes an acoustics coupler securely connected to the end of the output cable and being adapted to be connected to a telephone.

8 Claims, 2 Drawing Sheets

AUTOMOTIVE DIAGNOSTIC INTERFACE DEVICE

BACKGROUND OF THE INVENTION

1. Field of the Invention

The present invention relates to an automotive diagnostic interface modem and more particularly pertains to a new automotive diagnostic interface device for quickly determining engine problems from a remote location.

2. Description of the Prior Art

The use of an automotive diagnostic interface modem is known in the prior art. More specifically, an automotive diagnostic interface modem heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,442,553; U.S. Pat. No. 4,989,146; U.S. Pat. No. 4,831,539; U.S. Pat. No. 4,593,357; U.S. Pat. No. 5,050,080; and U.S. Pat. No. Des. 374,183.

While these devices fulfill their respective, particular objectives and requirements, the aforementioned patents do not disclose a new automotive diagnostic interface device. The inventive device includes a hand-held interface unit including a housing, a microprocessor disposed in the housing and having circuitry for interfacing with an engine management computer system and also having circuitry for transforming and transmitting data to a receiver/transmitter with the hand-held interface unit further including an input cable connected to the microprocessor and having an end, and an output cable connected to the microprocessor and having an end; and also includes an adapter plug securely connected to the end of the input cable and being adapted to be received in a diagnostic port of the engine management computer system; and further includes an acoustics coupler securely connected to the end of the output cable and being adapted to be connected to a telephone.

In these respects, the automotive diagnostic interface device according to the present invention substantially departs from the conventional concepts and designs of the prior art, and in so doing provides an apparatus primarily developed for the purpose of quickly determining engine problems from a remote location.

SUMMARY OF THE INVENTION

In view of the foregoing disadvantages inherent in the known types of automotive diagnostic interface modem now present in the prior art, the present invention provides a new automotive diagnostic interface device construction wherein the same can be utilized for quickly determining engine problems from a remote location.

The general purpose of the present invention, which will be described subsequently in greater detail, is to provide a new automotive diagnostic interface device which has many of the advantages of the automotive diagnostic interface modem mentioned heretofore and many novel features that result in a new automotive diagnostic interface device which is not anticipated, rendered obvious, suggested, or even implied by any of the prior art automotive diagnostic interface modem, either alone or in any combination thereof.

To attain this, the present invention generally comprises includes a hand-held interface unit including a housing, a microprocessor disposed in the housing and having circuitry for interfacing with an engine management computer system and also having circuitry for transforming and transmitting data to a receiver/transmitter with the hand-held interface unit further including an input cable connected to the microprocessor and having an end, and an output cable connected to the microprocessor and having an end; and also includes an adapter plug securely connected to the end of the input cable and being adapted to be received in a diagnostic port of the engine management computer system; and further includes an acoustics coupler securely connected to the end of the output cable and being adapted to be connected to a telephone.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automotive diagnostic interface device which has many of the advantages of the automotive diagnostic interface modem mentioned heretofore and many novel features that result in a new automotive diagnostic interface device which is not anticipated, rendered obvious, suggested, or even implied by any of the prior art automotive diagnostic interface modem, either alone or in any combination thereof.

It is another object of the present invention to provide a new automotive diagnostic interface device which may be easily and efficiently manufactured and marketed.

It is a further object of the present invention to provide a new automotive diagnostic interface device which is of a durable and reliable construction.

An even further object of the present invention is to provide a new automotive diagnostic interface device which is susceptible of a low cost of manufacture with regard to both materials and labor, and which accordingly is then susceptible of low prices of sale to the consuming public, thereby making such automotive diagnostic interface device economically available to the buying public.

Still yet another object of the present invention is to provide a new automotive diagnostic interface device which provides in the apparatuses and methods of the prior art some of the advantages thereof, while simultaneously overcoming some of the disadvantages normally associated therewith.

Still another object of the present invention is to provide a new automotive diagnostic interface device for quickly determining engine problems from a remote location.

Yet another object of the present invention is to provide a new automotive diagnostic interface device which includes includes a hand-held interface unit including a housing, a microprocessor disposed in the housing and having circuitry for interfacing with an engine management computer system and also having circuitry for transforming and transmitting data to a receiver/transmitter with the hand-held interface unit further including an input cable connected to the microprocessor and having an end, and an output cable connected to the microprocessor and having an end; and also includes an adapter plug securely connected to the end of the input cable and being adapted to be received in a diagnostic port of the engine management computer system; and further includes an acoustics coupler securely connected to the end of the output cable and being adapted to be connected to a telephone.

Still yet another object of the present invention is to provide a new automotive diagnostic interface device that is easy and convenient to attach to the engine management computer system of a vehicle.

Even still another object of the present invention is to provide a new automotive diagnostic interface device that could eliminate having to send a wrecker to the location to pick up the vehicle if the problem can be solved with the assistance of a mechanic.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
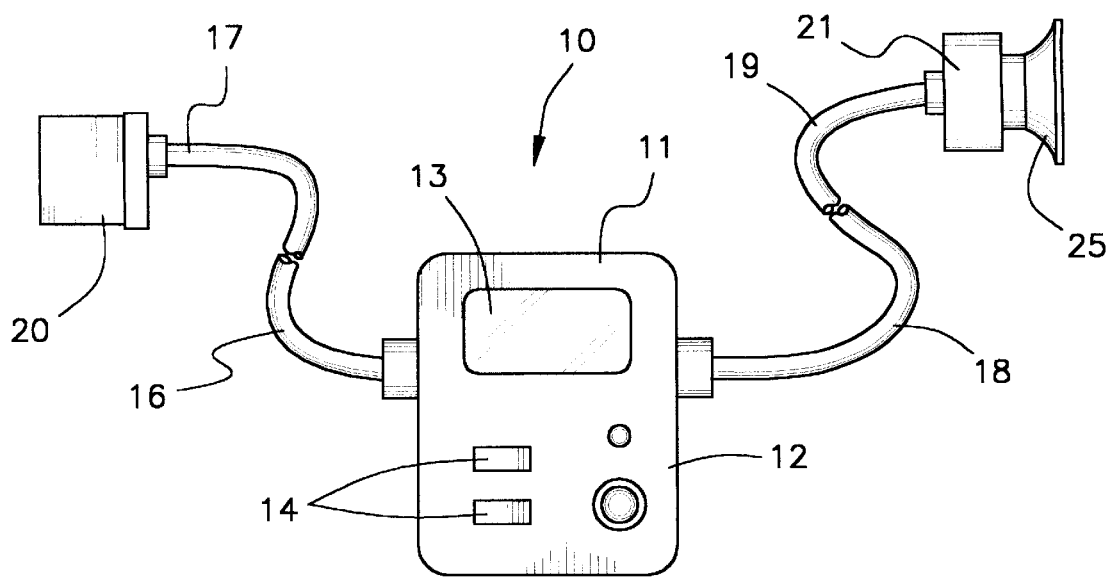
FIG. 1 is a side elevational view of a new automotive diagnostic interface device according to the present invention.
Figure 2:
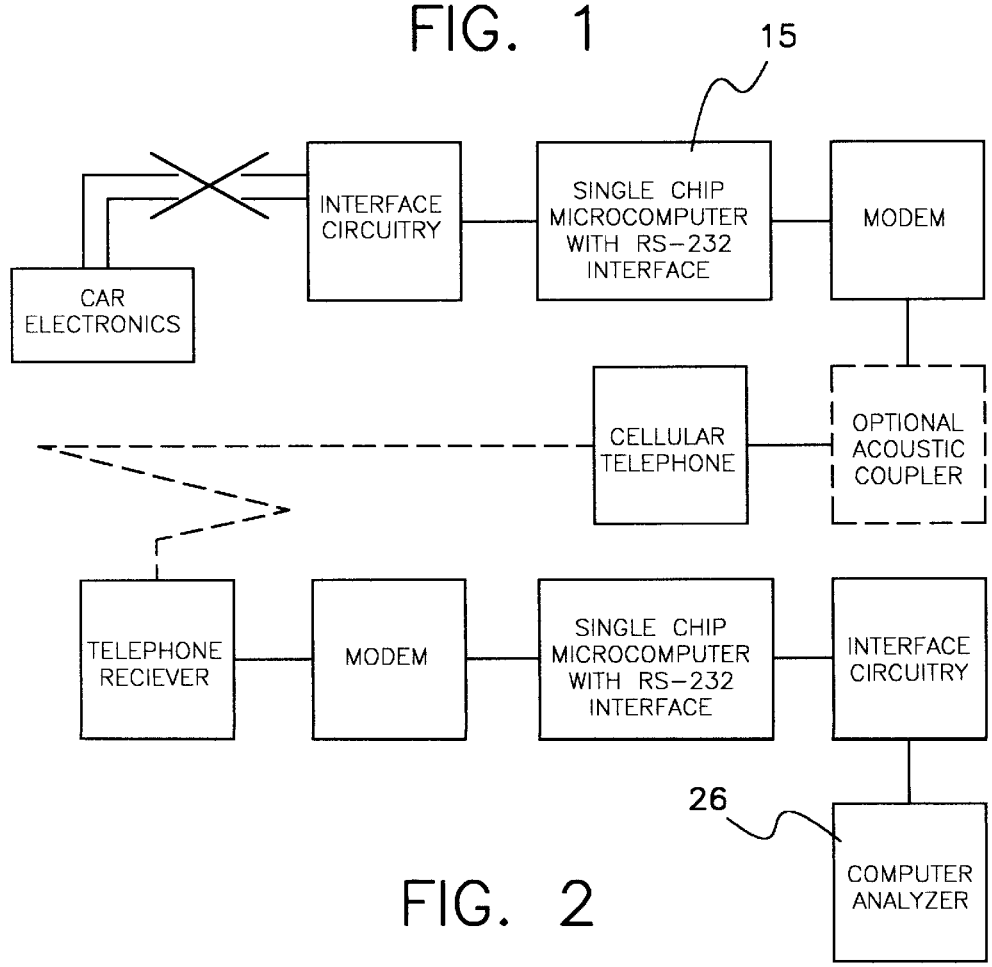
FIG. 2 is a schematic diagram of the present invention.
Figure 3:
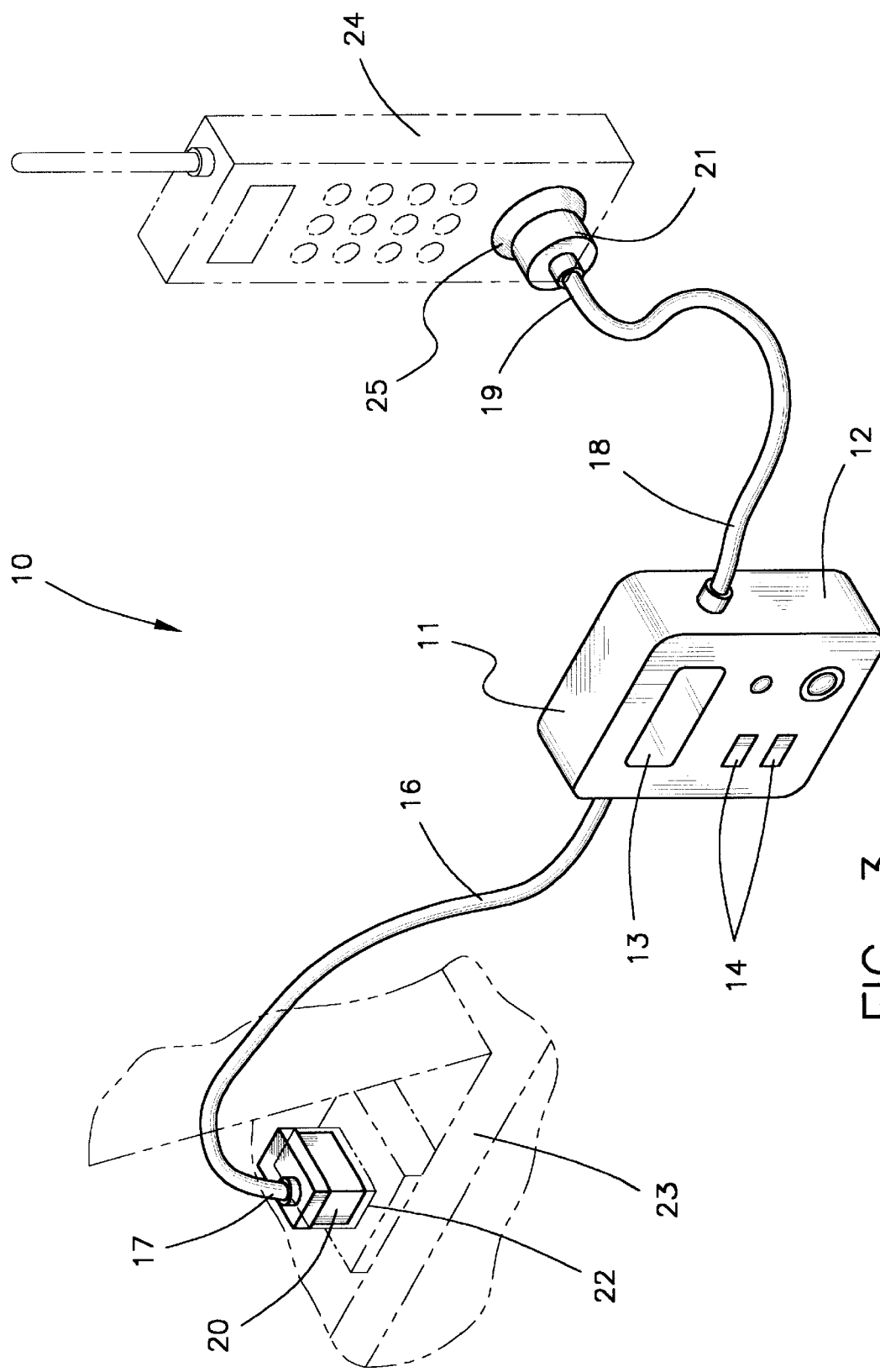
FIG. 3 is a perspective view of the present invention in use.

With reference now to the drawings, and in particular to FIGS. 1 through 3 thereof, a new automotive diagnostic interface device embodying the principles and concepts of the present invention and generally designated by the reference numeral 10 will be described.

As best illustrated in FIGS. 1 through 3, the automotive diagnostic interface device 10 generally comprises a hand-held interface unit 11 including a housing 12, a microprocessor 15 conventionally disposed in the housing 12 and having circuitry for interfacing with an engine management computer system 23 and also having circuitry for transforming and transmitting data to a receiver/transmitter 24. The hand-held interface unit 11 further includes an input cable 16 conventionally connected to the microprocessor 15 and having an end 17, and also includes an output cable 18 conventionally connected to the microprocessor 15 and having an end 19. The interface unit 11 further includes a screen 13 conventionally disposed in a wall of the housing 12 for displaying data received from the engine management computer system 23, and the interface unit 11 also includes a plurality of keys 14 conventionally disposed in the wall of the housing 12 for controlling the receiving and transmitting of data through the microprocessor 15 and to a remote diagnostic machine 26. The microprocessor 15 is adapted to receive fault codes from the engine management computer system 23 and is adapted to transmit the fault codes through the output cable 18 to the remote diagnostic machine 26 for immediate diagnosis of engine problems of a vehicle with the microprocessor 15 including a RS-232 interface An adapter plug 20 is securely and conventionally connected to the end 17 of the input cable 16 and is adapted to be received in a diagnostic port 22 of the engine management computer system 23. An acoustics coupler 21 is securely and conventionally connected to the end 19 of the output cable 18 and is adapted to be connected to a telephone 24 with the acoustics coupler 21 including a flexible membrane 25 adapted to detachably attach by suction to the telephone 24 including a cellular telephone.

In use, the microprocessor 15 receives fault codes from the engine management computer system 23 and transmits the fault codes through the telephone 24 to a remote diagnostic machine 26 where the fault codes are deciphered for determining the engine problems.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automotive diagnostic interface device comprising:
  a hand-held interface unit including a housing, a microprocessor disposed in said housing and having circuitry for interfacing with an engine management computer system and also having circuitry for transforming and transmitting data to a receiver/transmitter, said hand-held interface unit further including an input cable connected to said microprocessor and having an end, and an output cable connected to said microprocessor and having an end;

an adapter plug securely connected to said end of said input cable and being adapted to be received in a diagnostic port of the engine management computer system;

an acoustics coupler securely connected to said end of said output cable and being adapted to be connected to a telephone; and wherein said acoustics coupler includes a flexible membrane adapted to detachably attach to the telephone over a mouthpiece of the telephone such that said flexible membrane is adapted for blocking external noises from being received by the telephone.

2. An automotive diagnostic interface device as described in claim 1, wherein said interface unit further includes a screen disposed in a wall of said housing for displaying data received from the engine management computer system.

3. An automotive diagnostic interface device as described in claim 2, wherein said interface unit also includes a plurality of keys disposed in said wall of said housing for controlling the receiving and transmitting of data through said microprocessor and to a remote diagnostic machine.

4. An automotive diagnostic interface device as described in claim 1, wherein said microprocessor is adapted to receive fault codes from the engine management computer system and is adapted to transmit said fault codes through said output cable to the remote diagnostic machine for immediate diagnosis of engine problems of a vehicle.

5. An automotive diagnostic interface device as described in claim 1, wherein said microprocessor includes a RS-232 interface.

6. An automotive diagnostic interface device as described in claim 1, wherein said flexible membrane of said acoustics coupler comprises a frusta conical perimeter wall with a perimeter edge adapted for engaging a surface of the mouthpiece of the telephone, said flexible membrane being adapted to create a suction condition between said flexible membrane and the mouthpiece of the telephone.

7. An automotive diagnostic interface device comprising:

a hand-held interface unit including a housing, a microprocessor disposed in said housing and having circuitry for interfacing with an engine management computer system and also having circuitry for transforming and transmitting data to a receiver/transmitter, said hand-held interface unit further including an input cable connected to said microprocessor and having an end, and an output cable connected to said microprocessor and having an end, said interface unit further including a screen disposed in a wall of said housing for displaying data received from the engine management computer system, said interface unit also including a plurality of keys disposed in said wall of said housing for controlling the receiving and transmitting of data through said microprocessor and to a remote diagnostic machine, said microprocessor being adapted to receive fault codes from the engine management computer system and being adapted to transmit said fault codes through said output cable to the remote diagnostic machine for immediate diagnosis of engine problems of a vehicle, said microprocessor including a RS-232 interface;

an adapter plug securely connected to said end of said input cable and being adapted to be received in a diagnostic port of the engine management computer system; and an acoustics coupler securely connected to said end of said output cable and being adapted to be connected to a telephone, said acoustics coupler including a flexible membrane adapted to detachably attach by suction to the telephone including a cellular telephone such that said flexible membrane is adapted for blocking external noises from being received by the telephone.

8. A method of immediately diagnosing engine problems from a remote location includes the steps of:

providing a hand-held interface unit including a microprocessor having circuitry for interfacing with an engine management computer system and also having circuitry for transforming and transmitting data to a receiver/transmitter, said hand-held interface unit further including an input cable connected to said microprocessor and having an end, and an output cable connected to said microprocessor and having an end, and also providing an adapter plug securely connected to said end of said input cable, and further providing an acoustics coupler securely connected to said end of said output cable;

connecting said adapter plug to a diagnostic port of an engine management computer system;

connecting said acoustics coupler to a telephone, wherein said acoustics coupler includes a flexible membrane adapted to detachably attach by suction to the telephone such that said flexible membrane is adapted for blocking external noises from being received by the telephone;

receiving fault codes from the engine management computer system by said microprocessor; and transmitting said fault codes through the telephone to a remote diagnostic machine where said fault codes are deciphered for determining the engine problems.

* * * * *